(No Model.)
P. L. JORDAN.
COMBINED COTTON CHOPPER AND CULTIVATOR.
No. 420,235. Patented Jan. 28, 1890.
Fig. 1.
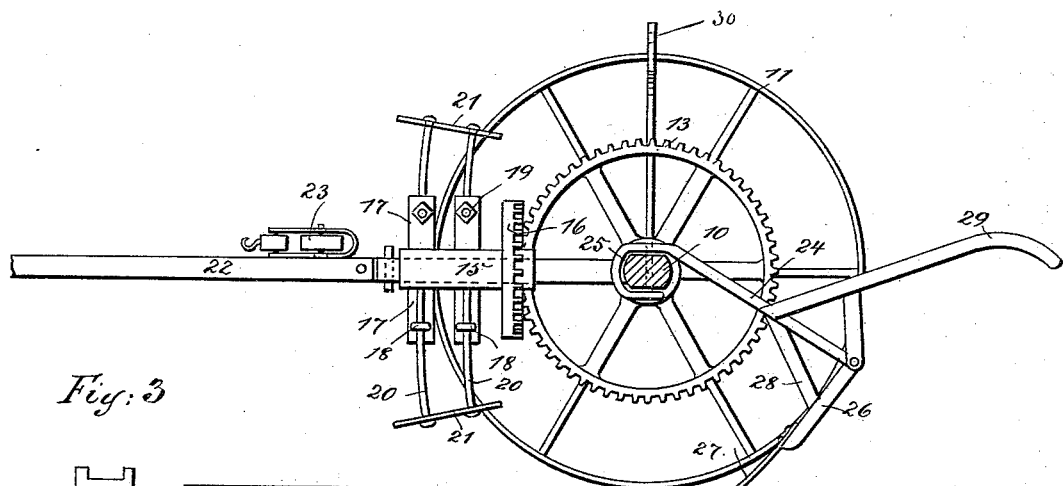
Fig. 3.
Fig. 2.
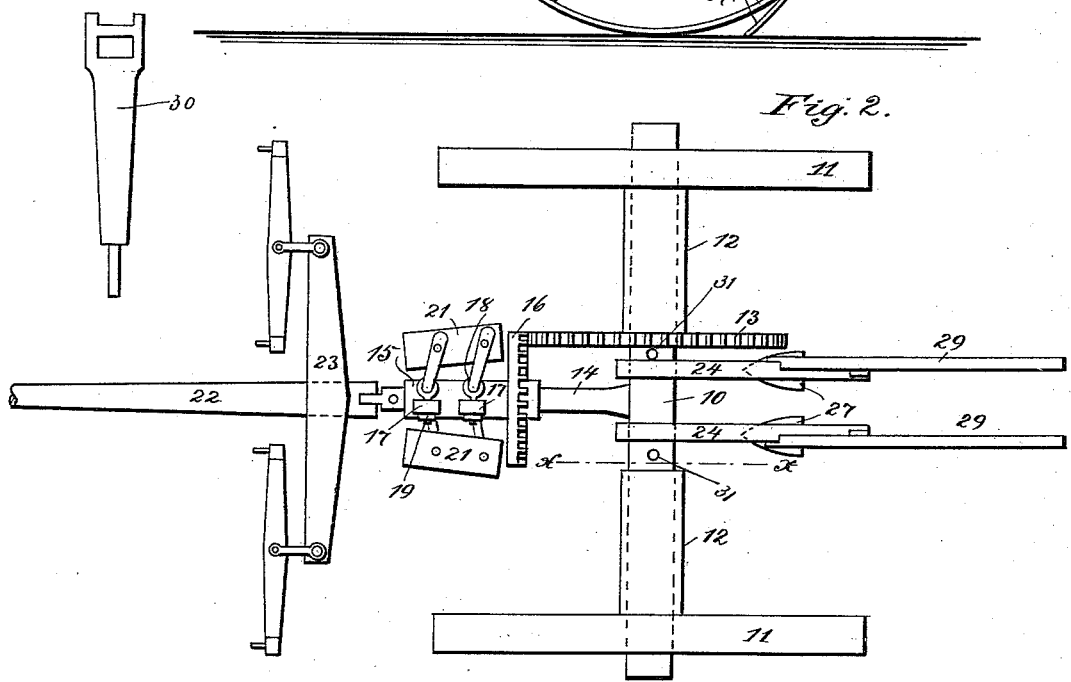
WITNESSES:
D. C. Reusch
C. Sedgwick
INVENTOR:
P. L. Jordan
BY
Munn & Co.
ATTORNEYS.

UNITED STATES PATENT OFFICE.

PERRY L. JORDAN, OF GARVIN, TEXAS.

COMBINED COTTON CHOPPER AND CULTIVATOR.

SPECIFICATION forming part of Letters Patent No. 420,235, dated January 28, 1890.

Application filed August 22, 1889. Serial No. 321,590. (No model.)

*To all whom it may concern:*

Be it known that I, PERRY L. JORDAN, of Garvin, in the county of Wise and State of Texas, have invented a new and Improved Combined Cotton Chopper and Cultivator, of which the following is a full, clear, and exact description.

My invention relates to a combined cotton chopper and cultivator or sweep, and has for its object to provide an implement of simple and durable construction and capable of being manufactured at a minimum cost; and the invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a vertical section through the axle, taken on line x x of Fig. 2, illustrating the operative parts of the implement in side elevation. Fig. 2 is a plan view, and Fig. 3 is a side elevation of the rein-holder detached.

In carrying out the invention the axle 10 is preferably made rectangular in cross-section at the center and cylindrical at the ends, as illustrated in Fig. 2, upon which cylindrical surfaces the drive-wheels 11 are loosely mounted. To the inner face of each drive-wheel a sleeve 12 is rigidly attached, and to the inner end of one of said sleeves a spur-wheel 13 is secured.

From the center of the axle 10 a reach-bar 14 is forwardly projected, and upon said reach-bar, near the outer end, a sleeve 15 is held to revolve, having integral with one end a pinion 16, adapted to mesh with the teeth of the spur-gear 13, as illustrated in Fig. 1.

From opposite sides of the sleeve 15 two or more arms 17 are outwardly projected, each of said arms being provided with an aperture near the outer extremity, through each of which apertures the threaded shank of a staple 18 is carried, which threaded shanks of the staples are provided with suitable lock-nuts 19. Through each of the staples one end of a rod 20 is passed, which rods are adapted for attachment to the scraper-blades 21. A scraper-blade is provided for each set of arms 17, and the cutting-edges of the said blades are made to face in opposite directions. To that end the extremities of the opposite sets of scraper-rods 20 are oppositely curved, and the curving of the scraper-rods also imparts to the scraper-blades a slight inward inclination.

By reason of the connection between the scraper-rods and the arms 17 illustrated it will be observed that the scrapers may be carried farther outward or drawn closer to the sleeve 15, as the width of the row to be treated demands.

To the end of the reach-bar 14, upon which the scraper-carrying sleeve is mounted, a pole 22 is attached, provided with the usual doubletree 23.

In connection with the scraper, when it is desired to use the implement as a scraper and cultivator, cultivator-stocks 24 are attached, the said stocks being formed at the forward end with a hook 25 to embrace the rectangular or central portion of the axle. Two of these cultivator-stocks are ordinarily employed, and each is provided with a downwardly-extending section 26, to which the cultivator-shovel 27 is attached. The section 26 is usually connected to the body by a suitable brace-bar 28, and a handle 29 is also attached to the body, extending upwardly and rearwardly therefrom, whereby as the machine is driven forward the operator, by grasping the handles 29 of the cultivator-stocks, may guide the shovels in any desired direction and cause them to travel to any desired depth.

In order to prevent the driving-reins from catching in the cultivator-arms, I provide two rein-holders 30, (illustrated in detail in Fig. 3,) consisting of a metal rod provided with guide-recesses in the upper end and a pintle at the lower end, which latter is adapted to enter a recess 31, produced in the axle. (See Fig. 2.) Two recesses 31 are employed, one being located near the outer face of each cultivator-arm.

It is obvious that when the cultivator attachment is not needed it may be removed by simply unhooking the stocks from the axle. It is also obvious that as the machine is drawn forward the spur-wheel is revolved by the movement of the drive-wheels, and that the said spur-wheels, acting in turn upon the pinion 16, will cause the scraper-blades to be revolved.

Having thus described my invention, I claim as new and desire to secure by Letters Patent—

1. In a combined cotton chopper and cultivator, the combination, with the axle 10 and the wheels 11, provided with the sleeves 12, one of which is provided with the spur-wheel 13, of the reach-bar 14, secured to the axle, the sleeve 15, mounted on the said bar and provided with the pinion 16, the arms 17, secured to the sleeve 15, the curved rods 20, adjustably secured to the arm 17, and the blades 21, secured to outer ends of the said rods, substantially as herein shown and described.

2. In a combined cotton chopper and cultivator of the character described, the combination, with the axle 10, the central portion of which is rectangular in cross-section, of the cultivator-stocks 24, provided with hooks 25 to embrace the rectangular central portion of the axle, the shovel-standards 26, secured to the outer ends of the stocks, shovels 27 on the standards, and the handles 29, substantially as and for the purpose set forth.

PERRY L. JORDAN.

Witnesses:
JOHN J. TERRELL,
J. W. TYLER.